United States Patent
Tiirola et al.

(10) Patent No.: US 11,997,685 B2
(45) Date of Patent: May 28, 2024

(54) RESOURCE PROCESSING IN A COMMUNICATION SYSTEM USING MULTIPLE PROTOCOLS

(71) Applicant: Nokia Technologies Oy, Espoo (FI)

(72) Inventors: Esa Tapani Tiirola, Kempele (FI); Sami-Jukka Hakola, Kempele (FI); Karri Markus Ranta-Aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/338,168

(22) PCT Filed: Sep. 30, 2016

(86) PCT No.: PCT/EP2016/073510
§ 371 (c)(1),
(2) Date: Mar. 29, 2019

(87) PCT Pub. No.: WO2018/059720
PCT Pub. Date: Apr. 5, 2018

(65) Prior Publication Data
US 2020/0029308 A1    Jan. 23, 2020

(51) Int. Cl.
| | | |
|---|---|---|
| *H04W 72/04* | (2023.01) | |
| *H04L 1/00* | (2006.01) | |
| *H04L 5/00* | (2006.01) | |
| *H04L 27/26* | (2006.01) | |
| *H04W 72/0453* | (2023.01) | |
| *H04W 72/23* | (2023.01) | |
| *H04W 80/06* | (2009.01) | |

(52) U.S. Cl.
CPC ......... *H04W 72/23* (2023.01); *H04L 1/0075* (2013.01); *H04L 5/0048* (2013.01); *H04L 5/0053* (2013.01); *H04L 27/261* (2013.01); *H04W 72/0453* (2013.01); *H04W 80/06* (2013.01)

(58) Field of Classification Search
CPC .......... H04W 72/042; H04W 72/0453; H04W 80/06; H04L 5/0053; H04L 27/261; H04L 1/0075; H04L 5/0048
USPC .......................................... 370/329
See application file for complete search history.

(56) References Cited

U.S. PATENT DOCUMENTS

| | | | |
|---|---|---|---|
| 2010/0172310 A1* | 7/2010 | Cheng | H04W 64/00 370/329 |
| 2012/0258724 A1* | 10/2012 | Kim | H04W 72/082 455/452.2 |
| 2012/0302273 A1* | 11/2012 | Lin | H04W 16/14 455/509 |
| 2014/0056265 A1* | 2/2014 | Koivisto | H04W 72/51 370/329 |

(Continued)

FOREIGN PATENT DOCUMENTS

| | | |
|---|---|---|
| EP | 1 198 148 A1 | 4/2002 |
| WO | WO 2005/018180 A1 | 2/2005 |
| WO | WO-2017107212 A1 * | 6/2017 |

Primary Examiner — Faisal Choudhury
(74) Attorney, Agent, or Firm — Harrington & Smith

(57) ABSTRACT

There is provided a method including determining that a first resource is to be designated as being used in accordance with a first communications protocol; forming an indication for a second apparatus operating in accordance with a second communications protocol, the indication indicating that the first resource is to be blanked; and transmitting, using dedicated signaling, the formed indication to the second apparatus.

17 Claims, 8 Drawing Sheets

(56) References Cited

U.S. PATENT DOCUMENTS

| | | | |
|---|---|---|---|
| 2014/0112254 A1* | 4/2014 | Lindoff | H04W 74/002 370/328 |
| 2014/0233466 A1* | 8/2014 | Pourahmadi | H04L 5/0051 370/329 |
| 2014/0269464 A1* | 9/2014 | Park | H04W 48/16 370/328 |
| 2015/0011233 A1* | 1/2015 | Kazmi | H04W 72/044 455/454 |
| 2016/0183302 A1* | 6/2016 | Chen | H04W 74/0808 370/329 |
| 2018/0041922 A1* | 2/2018 | Chen | H04W 28/06 |
| 2018/0175983 A1* | 6/2018 | Yum | H04L 5/0053 |
| 2019/0288812 A1* | 9/2019 | Chen | H04L 1/0003 |
| 2020/0029391 A1* | 1/2020 | Xu | H04W 80/08 |
| 2021/0282041 A1* | 9/2021 | Kwak | H04L 25/0204 |

* cited by examiner

RESOURCE PROCESSING IN A COMMUNICATION SYSTEM USING MULTIPLE PROTOCOLS

CROSS REFERENCE TO RELATED APPLICATION

This patent application is a U.S. National Stage application of International Patent Application Number PCT/EP2016/073510 filed Sep. 30, 2016, which is hereby incorporated by reference in its entirety.

FIELD

The present application relates to a method, apparatus, and computer program.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE) or user apparatus. A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the 3rd Generation Partnership Project (3GPP). The LTE employs the Evolved Universal Terrestrial Radio Access Network (E-UTRAN) access and a further development thereof which is sometimes referred to as LTE Advanced (LTE-A). Since introduction of fourth generation (4G) services increasing interest has been paid to the next, or fifth generation (5G) standard. According to current 3GPP terminology, 5G is referred to as a New Radio (NR)

SUMMARY

According to a first aspect, there is provided a method comprising: determining that a first resource is to be designated as being used in accordance with a first communications protocol; forming an indication for a second apparatus operating in accordance with a second communications protocol, the indication indicating that the first resource is to be blanked; and transmitting, using dedicated signaling, the formed indication to the second apparatus.

The method may further comprise: determining that the first resource is one of a first plurality of resources to be used in accordance with the first communications protocol, the first plurality of resources forming a first predefined configuration of resources; and including in the indication an explicit indication of the first predefined configuration.

The method may further comprise: determining that a second resource is to be used in accordance with the first communications protocol, said second resource being one of a second plurality of resources to be used in accordance with the first communications protocol, the second plurality of resources forming a second predefined configuration of resources; and transmitting an indication of the second predefined configuration to the second apparatus.

The first and second predefined configuration of resources may be determined for one of: the second apparatus alone; a plurality of apparatuses, the plurality comprising the second apparatus; a specific channel; and a specific signal to be transmitted.

The method may further comprise: determining that a third resource is to be used in accordance with the first communications protocol; forming an indication for indicating that the third resource is to be blanked; and transmitting, using non-dedicated signaling, the indication to the second apparatus operating in accordance with the second communications protocol.

According to a second aspect, there is provided a method comprising: receiving, at a second apparatus operating in accordance with a second communications protocol, via dedicated signaling, an indication that indicates that a first resource is to be blanked and that said first resource is designated as being used in accordance with a first communications protocol; and treating the first resource as blanked in accordance with the second communications protocol.

The indication may comprise an explicit indication of a first predefined configuration, wherein the first resource is one of a first plurality of resources to be used in accordance with the first communications protocol, the first plurality of resources forming the first predefined configuration of resources.

The method may further comprise receiving an indication of a second predefined configuration, wherein the second predefined configuration indicates a second resource that is to be used in accordance with the first communications protocol, said second resource being one of a second plurality of resources to be used in accordance with the first communications protocol, the second plurality of resources forming the second predefined configuration of resources.

The method may further comprise receiving at least one indication that indicates that the first and second predefined configuration of resources are for one of: the second apparatus alone; a plurality of apparatuses, the plurality comprising the second apparatus; a specific channel; and a specific signal to be transmitted The method may further comprise receiving, via non-dedicated signaling, an indication indicating that a third resource is to be blanked because the third resource is to be used in accordance with the first communications protocol.

Treating the first resource as blanked may comprises: rate matching and mapping data around the first resource so as to exclude the first resource from the rate matching and mapping operation.

In both of the above described method aspects, the following features may be applied.

The second communications protocol may be an earlier version of the first communications protocol.

Said dedicated signaling may be dedicated for at least one of a specific apparatus, a group of apparatuses; and/or a specific channel, and/or a specific signal.

The indication may comprise an indication that the first resource is to be blanked because the first resource is assigned to at least one apparatus operating in accordance with the first communications protocol.

The first resource may be designated as being used in accordance with a first communications protocol if the first resource is used to provide a guard band between the resources used for transmission on the first and second communication protocols at any one time.

The indication may be transmitted to the second apparatus using a layer one downlink control information element.

The indication may comprise an explicit indication that indicates whether or not a forward compatible resource configuration is to be applied by the second apparatus.

According to a third aspect, there is provided an apparatus comprising: at least one processor; and at least one memory comprising code that, when executed by the at least one processor, causes the at least one processor to: determine that a first resource is to be designated as being used in accordance with a first communications protocol; form an indication for a second apparatus operating in accordance with a second communications protocol, the indication indicating that the first resource is to be blanked; and transmit, using dedicated signaling, the formed indication to the second apparatus.

The processor may be further caused to: determine that the first resource is one of a first plurality of resources to be used in accordance with the first communications protocol, the first plurality of resources forming a first predefined configuration of resources; and include in the indication an explicit indication of the first predefined configuration.

The processor may be further caused to: determine that a second resource is to be used in accordance with the first communications protocol, said second resource being one of a second plurality of resources to be used in accordance with the first communications protocol, the second plurality of resources forming a second predefined configuration of resources; and transmit an indication of the second predefined configuration to the second apparatus.

The first and second predefined configuration of resources may be determined for one of: the second apparatus alone; a plurality of apparatuses, the plurality comprising the second apparatus; a specific channel; and a specific signal to be transmitted.

The processor may be further caused to: determine that a third resource is to be used in accordance with the first communications protocol; form an indication for indicating that the third resource is to be blanked; and transmit, using non-dedicated signaling, the indication to the second apparatus operating in accordance with the second communications protocol.

According to a fourth aspect, there is provided an apparatus comprising: at least one processor; and at least one memory comprising code that, when executed by the at least one processor, causes the at least one processor to: receive, via dedicated signaling, an indication that indicates that a first resource is to be blanked and that said first resource is designated as being used in accordance with a first communications protocol, wherein at the apparatus is a second apparatus operating in accordance with a second communications protocol; and treat the first resource as blanked in accordance with the second communications protocol.

The indication may comprise an explicit indication of a first predefined configuration, wherein the first resource is one of a first plurality of resources to be used in accordance with the first communications protocol, the first plurality of resources forming the first predefined configuration of resources.

The processor may be further caused to: receive an indication of a second predefined configuration, wherein the second predefined configuration indicates a second resource that is to be used in accordance with the first communications protocol, said second resource being one of a second plurality of resources to be used in accordance with the first communications protocol, the second plurality of resources forming the second predefined configuration of resources.

The processor may be further caused to receive at least one indication that indicates that the first and second predefined configuration of resources are for one of: the second apparatus alone; a plurality of apparatuses, the plurality comprising the second apparatus; a specific channel; and a specific signal to be transmitted The processor may be further caused to: receive, via non-dedicated signaling, an indication indicating that a third resource is to be blanked because the third resource is to be used in accordance with the first communications protocol.

The processor may be configured to treat the first resource as blanked by: rate matching and mapping data around the first resource so as to exclude the first resource from the rate matching and mapping operation.

According to a fifth aspect, there is provided an apparatus comprising: means is for determining that a first resource is to be designated as being used in accordance with a first communications protocol; means for forming an indication for a second apparatus operating in accordance with a second communications protocol, the indication indicating that the first resource is to be blanked; and means for transmitting, using dedicated signaling, the formed indication to the second apparatus.

The apparatus may further comprise: means for determining that the first resource is one of a first plurality of resources to be used in accordance with the first communications protocol, the first plurality of resources forming a first predefined configuration of resources; and means for including in the indication an explicit indication of the first predefined configuration.

The apparatus may further comprise: means for determining that a second resource is to be used in accordance with the first communications protocol, said second resource being one of a second plurality of resources to be used in accordance with the first communications protocol, the second plurality of resources forming a second predefined configuration of resources; and means for transmitting an indication of the second predefined configuration to the second apparatus.

The first and second predefined configuration of resources may be determined for one of: the second apparatus alone; a plurality of apparatuses, the plurality comprising the second apparatus; a specific channel; and a specific signal to be transmitted.

The apparatus may further comprise: means for determining that a third resource is to be used in accordance with the first communications protocol; means for forming an indication for indicating that the third resource is to be blanked; and means for transmitting, using non-dedicated signaling, the indication to the second apparatus operating in accordance with the second communications protocol.

According to a fifth aspect, there is provided an apparatus comprising: means for receiving, via dedicated signaling, an indication that indicates that a first resource is to be blanked and that said first resource is designated as being used in accordance with a first communications protocol, wherein at the apparatus is a second apparatus operating in accordance with a second communications protocol; and means for treating the first resource as blanked in accordance with the second communications protocol.

The indication may comprise an explicit indication of a first predefined configuration, wherein the first resource is one of a first plurality of resources to be used in accordance with the first communications protocol, the first plurality of resources forming the first predefined configuration of resources.

The apparatus may further comprise: means for receiving an indication of a second predefined configuration, wherein the second predefined configuration indicates a second resource that is to be used in accordance with the first communications protocol, said second resource being one of a second plurality of resources to be used in accordance with the first communications protocol, the second plurality of resources forming the second predefined configuration of resources.

The apparatus may further comprise means for receiving at least one indication that indicates that the first and second predefined configuration of resources are for one of: the second apparatus alone; a plurality of apparatuses, the plurality comprising the second apparatus; a specific channel; and a specific signal to be transmitted The apparatus may further comprise: means for receiving, via non-dedicated signaling, an indication indicating that a third resource is to be blanked because the third resource is to be used in accordance with the first communications protocol.

Treating the first resource as blanked may comprise: rate matching and mapping data around the first resource so as to exclude the first resource from the rate matching and mapping operation.

The following features may be applied in respect of any of the apparatus aspects detailed above.

The second communications protocol may be an earlier version of the first communications protocol.

Said dedicated signaling may be dedicated for at least one of a specific apparatus, a group of apparatuses; and/or a specific channel; and/or a specific signal.

The indication may comprise an indication that the first resource is to be blanked because the first resource is assigned to at least one apparatus operating in accordance with the first communications protocol.

The first resource is designated as being used in accordance with a first communications protocol if the first resource is used to provide a guard band between the resources used for transmission on the first and second communication protocols at any one time.

The indication may be transmitted to the second apparatus using a layer one downlink control information element.

The indication may comprise an explicit indication that indicates whether or not a forward compatible resource configuration is to be applied by the second apparatus.

According to a seventh aspect, there is provided a computer program comprising computer executable instructions, which when executed by a computer, cause the computer to perform each of the method steps of any of claims 1 to 5 and claims 12 to 17 when dependent on any of claims 1 to 5.

According to an eight aspect, there is provided a computer program comprising computer executable instructions, which when executed by a computer, cause the computer to perform each of the method steps of any of claims 6 to 11 and claims 12 to 17 when dependent on any of claims 6 to 11.

BRIEF DESCRIPTION OF FIGURES

The invention will now be described in further detail, by way of example only, with reference to the following examples and accompanying drawings, in which.

DETAILED DESCRIPTION

Figure 1:
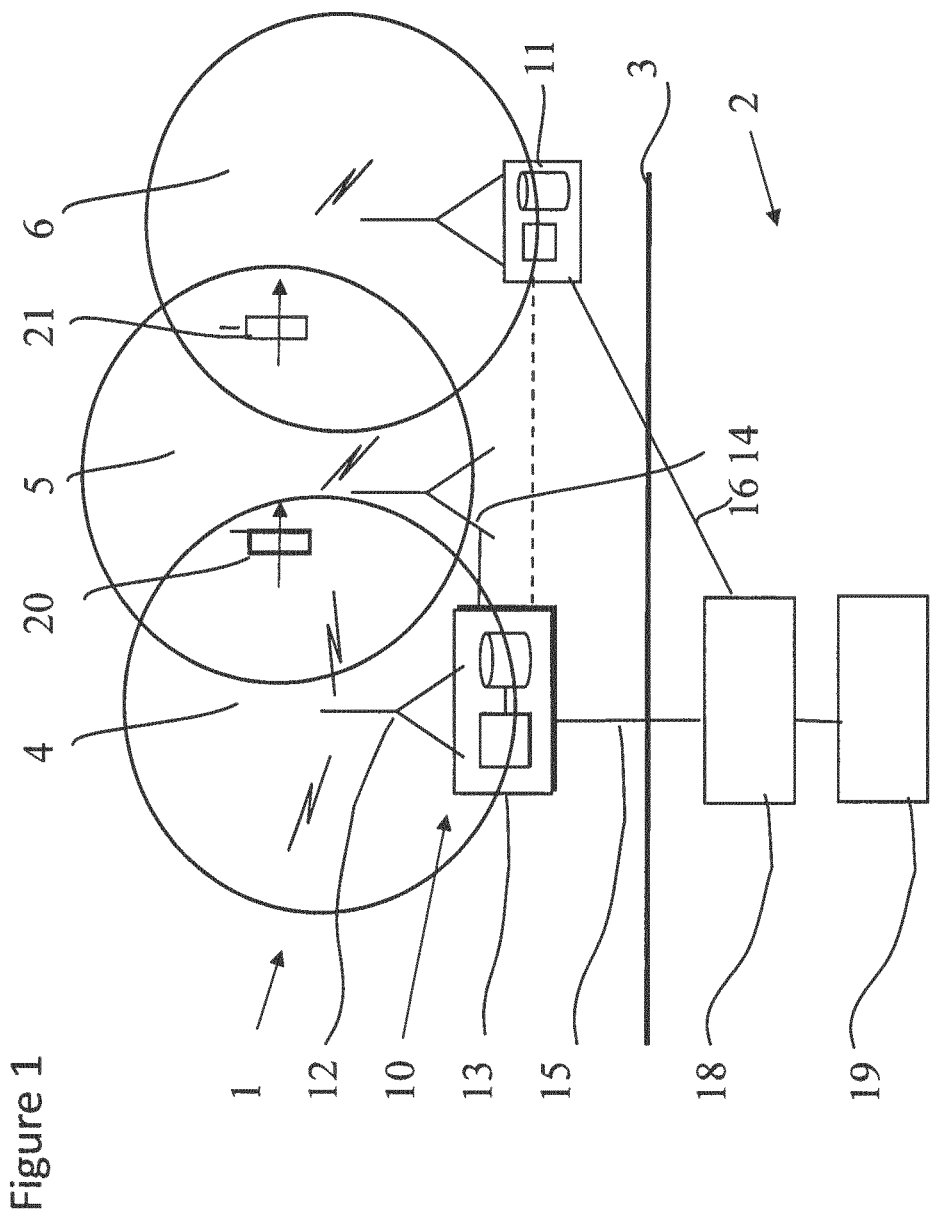
FIG. 1 shows a schematic example of a wireless communication system where the invention may be implemented.

In general, the following disclosure relates to providing a mechanism via which a network apparatus may indicate to an apparatus operating according to an earlier version of a communications protocol which resources/resource elements are designated by the network apparatus as being for communications to be made in accordance with a later version of that communications protocol. In response to receipt of such an indication, the apparatus may blank, or otherwise fail to utilise, those indicated resources. Such a mechanism may provide forward compatibility with later versions of the same protocols. However, it is understood that although the primary target is to provide forward compatibility, the provided functionalities can be used for various scenarios including, for example, coexistence between 5G/new radio and Long Term Evolution (LTE) protocols, 5G/new radio and WiFi, 5G/new radio and 3G, and 5G/new radio and GSM protocols.

In this context, and throughout the following, reference will be made to resources and/or resource elements. These are intended to be read synonymously. In a particular example, a resource is a basic unit of physical resource in a communications system. For example, in an LTE-specific embodiment, a slot located on a particular subcarrier comprises 6 or 7 orthogonal frequency division multiplex (OFDM) symbols (depending on the use of the slot). Therefore, in this example, a resource may be one of those symbols. Therefore, a resource may be considered as the smallest possible physical unit in a communications system for indicating information.

Further, the resource designated as being for communications made in accordance with the later version of that communications protocol may be indicated either individually or in a group of other such resources. If the resource is indicated as being part of a group, there may be a set of predefined resource configurations, with each configuration defining a group of resources. There may be a plurality of groups of resources. In particular, there may be more than two groups of such resources. A configuration may be defined with reference to a pattern. For example, a configuration may be defined by a bitmap. In this case, the bitmap may be used to mask certain frequencies forming part of the configuration. As another example, a configuration may be defined by a starting point and a periodicity.

In the following certain exemplifying embodiments are explained with reference to a wireless communication system serving communication devices adapted for wireless communication. Certain general principles of wireless systems are first briefly explained with reference to FIGS. 1 to 3.

A communication device 20, 21 can be used for accessing various services and/or applications provided via cells 4, 5, 6 of a cellular system. In a wireless communication system the access can be provided via wireless access interfaces between wireless communication devices and one or more base stations of a radio access network 1. Each communication device and base station may have one or more radio channels open at the same time and may receive signals from more than one source.

The communication devices can move from a cell to another, as illustrated by arrows on top of the devices 20 and 21 in FIG. 1. The process of handling the moving from a cell to the other is called handover. Handovers can be provided, for example, in wireless environment comprising one or more fifth generation (5G) radio access networks (RAN). A part of handover procedure is known as cell reselection.

A base station site can provide at least one cell. In the highly schematic FIG. 1 example, a base station site 10 comprising a controller 13 and base station apparatus 12 and 14 is shown to provide a plurality of cells 4 and 5, respectively. In the Figure, cell 4 is provided by antenna apparatus of station 12 in one location, and at least one further cell is provided by a remote radio head 14. It is noted that this exemplifying arrangement is only shown for illustrative purposes, and that e.g. antenna apparatus 12 can provide more than one cell. The relevance in view of certain examples described below is that the controller 13 of the base station site 10 can control access and devices accessing the radio access network 1 in a number of cells.

In addition to the base station site 12, at least one other cell can also be provided by means of another base station or stations. This possibility is denoted by base station 11 in FIG. 1. Signaling between base stations, and controllers thereof, can be provided via an appropriate interface, for example an X2 interface or an evolution of X2 interface which will be referred to as X2* interface. The X2* interface may be used in 5G, and may comprise enhancements over the X2 interface. This is denoted by the dashed line between the control entities 13 and 11.

A wireless system is typically divided between a radio access system 1, typically called radio access network (RAN) and a core network (CN) 2. The division is denoted by line 3. The core network can comprise elements such as mobile management entity (MME) 18, home subscriber server (HSS) 19 and so forth. Connection between base station sites of the radio access network (RAN) and core network (CN) element can be provided via appropriate interfaces 15, 16. The connection between the RAN and the CN can be, for example, via a S1 interface or an evolution of the S1 interface which will be referred to as S1* interface. The S1* interface may be used in 5G, and may comprise enhancements over the S1 interface.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). The architecture may of course alternatively comprise a future equivalent to E-UTRAN, for example the architecture of the "Next Gen" or 5G network. A non-limiting example of a base station of a cellular system is what is termed as a NodeB or E-UTRAN NodeB (eNB/ENodeB) in the vocabulary of the 3GPP specifications. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices. At least some of the stations may be arranged to operate on the unlicensed radio spectrum.

Figure 2:
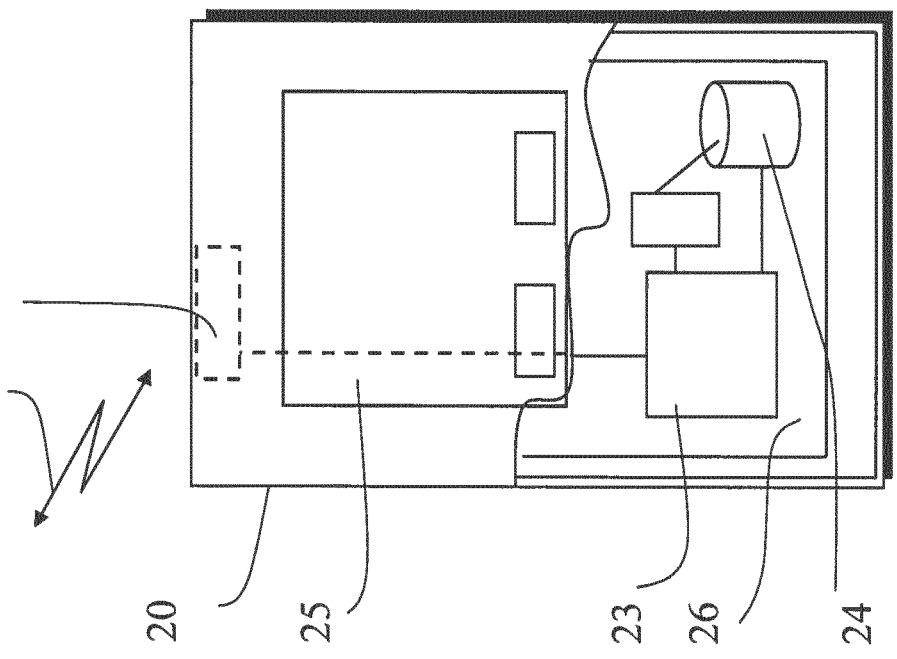
FIG. 2 shows an example of a communication device.

FIG. 2 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and/or other user terminals. The tasks can include operation related to mobility management such as handling handovers and cell reselections. Further, the tasks can also relate to security aspects of the communications. The data processing, storage and other relevant control apparatus can be provided on an appropriate circuit board and/or in chipsets. This apparatus is denoted by reference 26.

A user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

Figure 3:
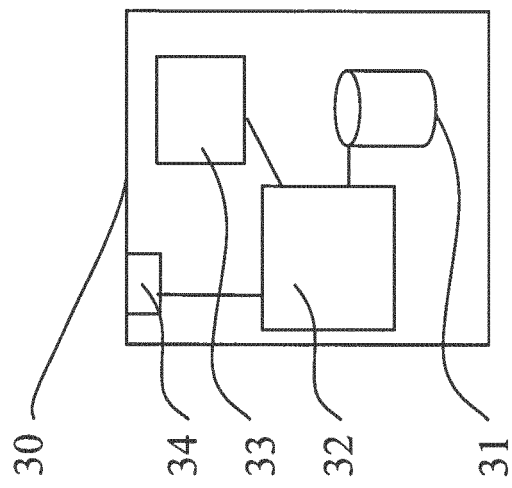
FIG. 3 shows an example of control apparatus.

FIG. 3 shows an example of a control apparatus 30 for a station, for example to be coupled to and/or for controlling one of the stations 11, 12 and 14 of FIG. 1. The control apparatus 30 can be arranged to provide control on configurations used by the communications devices accessing the station, information processing and/or communication operations. A control apparatus can be configured to provide control functions in association with generation, communications, and interpretation of control information. The control apparatus 30 comprises at least one memory 31, at least one data processing unit 32, 33 and an input/output interface 34. Via the interface the control apparatus can be coupled to the relevant node. The control apparatus 30 can be configured to execute an appropriate software code to provide the control functions.

Work for LTE release 14 and 5G New Radio (NR) has already begun. One of the topics that is under discussion is how to account for changes made to the communication protocol in the future. In other words, how to configure apparatuses to be forward compatible. The primary motivation is to support introduction of new transmission schemes and/or services (such as Sidelink (a device to device communication mechanism that does not do through a base station), self-backhauling (when a base station used for accessing a network and another network apparatus with which that base station is communicating, use the same wireless channel), Internet of Things (IoT), and ultra-reliable and low latency communications (URLLC)) in a way that both user apparatuses following the new radio Phase I specification and user apparatuses operating according to new transmission schemes and/or new services (e.g. according to new radio Phase II specifications) may coexist smoothly in the same carrier without compromising key performance indicators such as the capacity/coverage.

Figure 4:
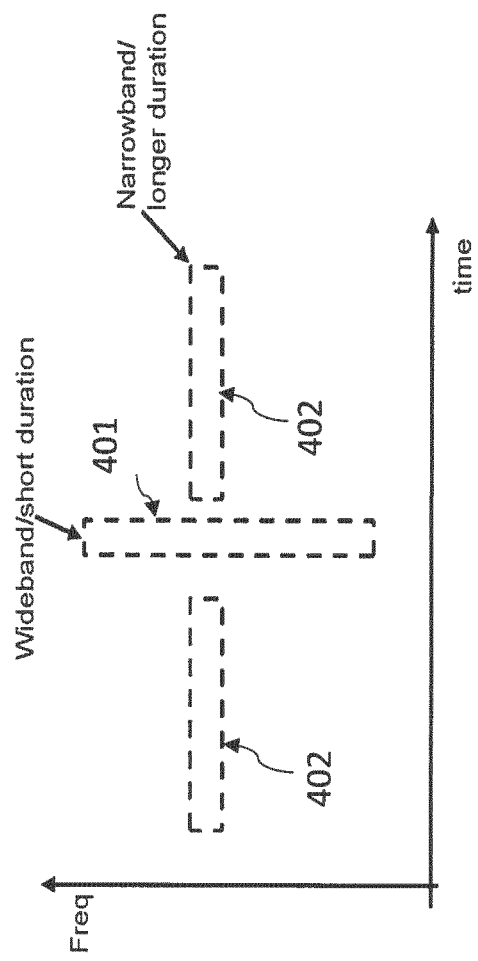
FIG. 4 shows an example of different types of communications.

Two examples of systems for which forward compatible resources may need to be provided are now illustrated with respect to FIG. 4.

FIG. 4 is a graph having time along the x-axis and frequency along the y axis. A first rectangular band 401 is depicted in the centre of the graph, having a much shorter time component than frequency component. Symmetrically on either side of the first band 401, there are provided second rectangular bands 402 having a much longer time component than frequency component.

The first band 401 represents a wideband transmission. An example of a possible wideband transmission that may be incorporated into future developments to the New Radio communication protocol is an URLLC service running on the New Radio carrier. URLLC transmissions typically have a relatively wide transmission bandwidth but short time duration.

The second band(s) 402 represent a narrowband transmission. An example of a possible narrowband transmission that may be incorporated into future developments to the New Radio communication protocol is a narrowband Internet of Things (NB-IoT), or eMTC (enhanced Machine Type Communications), service running on the new radio carrier. For coverage reasons, NB-IoT transmissions typically have a relatively long time duration compared to that of an enhanced mobile broadband service.

Some of the issues related to accounting for forward compatible were considered in the 3GGP study Item RP-160671 ("New SID proposal: Study on New Radio Access Technology"). In this study item, it was noted that the normative specification "would occur in two phases: Phase I (to be completed in June 2018) and Phase II (to be completed in December 2019)". Because of this, at least those apparatuses operating in accordance with the Phase I specification of the communication protocol must be forward compatible (in terms of efficient co-cell/site/carrier operation) with Phase II specification and beyond in order that the later specifications of the communication protocol are not limited in how they may be developed. The aim is to thus achieve a single technical framework addressing all usage scenarios, requirements, and deployment scenarios defined in 3GPP technical report TR 38.913 V0.4.0 ("Study on scenarios and Requirements for Next Generation access Technologies").

In RAN1 #84bis (held in Busan, Korea), several agreements relating to this forward compatible were made. In particular, it was identified that New Radio design should aim to maximise the amount of time and frequency resources that can be flexibly utilised or that can be left blanked without causing backward compatibility issues in the future, with blank resources being usable for future developments.

Therefore, at least one mechanism is to be provided for allocating and/or configuring resources for forward compatible reasons for an apparatus (such as user equipment) running on the New Radio Carrier. This mechanism(s) should aim to be: flexible enough to cover all potential radio developments in the future, have a small signaling burden, be robust against potential signaling errors, minimally increase the scheduler complexity related to forward compatible resource configuration and usage, maximise the amount of time and frequency resources that can be flexibly utilised or that can be left blank, and support a plurality of implementation options for the network apparatus configuring the forward compatible resources.

The following disclosure aims to provide at least one mechanism directed towards achieving at least one of the above-mentioned aims.

In essence, at least part of the following relates to providing a signaling method for signaling from a network apparatus (such as a base station, eNB and/or a generic access point) to another apparatus (such as a user apparatus) an indication of which resources should be considered as "blank" by the another apparatus as they are considered/determined, by the network apparatus, to be used pursuant to a more modern version of a communications protocol (or some other communication protocol) than the communications protocol used by the another apparatus. What resources may be considered as being as blanked may be defined by a particular communication protocol as being a resource that is not used for an intentional transmission pursuant to that communication protocol. Therefore, in certain scenarios "blank" resources may not be used by other communication protocols, but may be considered as, for example, unused resources. These unused resources may be used to provide, for example, guard band(s) to mitigate interference within a carrier, and/or between carriers, and/or between cells. Another example of how to use such unused resources is to use them as a guard time for providing sufficient switching time for the hardware (such as, for example, radio frequency (beam) switching in the case of analog/hybrid beamforming architecture or link direction switching in the case of half-duplex operation in paired or unpaired bands). In other words, a network apparatus is configured to indicate to a user apparatus (or some other apparatus for which the network apparatus is configured to allocate resources) which resources within a communication band defined by a second version of a communication protocol are to be used for other purposes, such as by a first (later) version of that communications protocol. By providing an indication to a user apparatus (or the like) which resources are designated as forward compatible resources, a user equipment may be configured to completely discount those forward compatible resources when operating in accordance with its communication protocol. In other words, the user equipment may be configured to blank those indicated forward compatible resources from its operation.

The described techniques may be applied on an intracell basis. In other words, the network apparatus may consider only communications to and/or from apparatus(es) located within a cell controlled by the network apparatus when determining which resources are designated by the network apparatus as being for communication to be made in accordance with the later version of that communications protocol. Therefore, the described techniques may not be applied on an intercell basis.

In the above and below disclosures, a blank resource (or a resource to be blanked/left unused) is a resource that is not available for use by the another apparatus under the communication protocol. Consequently, the another apparatus may be configured to rate match data around this blanked resource. Rate matching is a function of baseband processing in which the number of bits in a transport block is matched to a number of bits that can be transmitted in a given allocation of transmission resources. Some operations that may be comprised within rate matching include: repeating bits to increase the rate and/or puncture bits to decrease the rate. The another apparatus may also be able to puncture and/or drop the signal related to this blanked resource. Rate matching around the blanked resource may enable a desired quality of service to be more easily maintained for communications between the network apparatus and the another apparatus relative to simple puncturing across a non-blanked signal. Further, the another apparatus may be configured to perform measurements (such as those related to a link quality) on a communications channel. The another apparatus may be configured to avoid making measurements on and/or reporting measurements on those resources indicated as forward compatible resources being designated for communications to be made according to the later version of the protocol.

In the following, reference is made to a first protocol and a second protocol. However, it is understood that the second communications protocol may simply be an earlier version of the first communications protocol (such as LTE). A version of a communications protocol corresponds to the version of the specification that defines the communications protocol at any one time. Therefore, it may be said that the second protocol is defined in an earlier specification of the first communications protocol. It is also understood that the following relates to those communications protocols that require resources to be assigned to at least one apparatus for transmission and/or reception.

Further, throughout the following, reference is made to dedicated signaling. This may be seen as being a unicast signal (i.e. that the dedicated signal is a signal dedicated for a specific apparatus). However, it is also understood that dedicated signaling may alternatively or in addition refer to signaling dedicated to a specific channel and/or signaling dedicated for a specific signal. Furthermore, dedicated signaling may serve a predefined group of user apparatuses. Those user apparatuses may only comprise connected user apparatuses. In other words, those user apparatus not include user apparatuses in an IDLE mode, which has no radio resource connection to the cell.

Further, throughout the following, there is a transmitted indication. This indication may comprise an indication that the first resource is to be blanked by a user apparatus because the first resource is assigned for other purpose, such as to at least one apparatus operating in accordance with the first communications protocol. In other words, there may be an explicit indication as to the purpose for the blanking that is signaled to the user apparatus by the network apparatus.

Further, the resource designated as being for communications made in accordance with the later version of that communications protocol may be indicated either individually or in a group of other such resources. If the resource is indicated as being part of such a group, there may be a set of predefined resource configurations, with each configuration defining a group of resources. There may be a plurality of groups of resources. In particular, there may be more than two groups of such resources. As per the above, a configuration may be defined with reference to a pattern or a combination of more than one patterns. Further, the network apparatus may be configured to dynamically select a particular predefined resource configuration from the set of predefined resource configurations in dependence on the operation for which those resources are being assigned. In one particular example (detailed further below), one configuration may be used for periodic CSI-RS transmissions whilst another (different) configuration may be used for aperiodic CSI-RS transmissions.

As detailed further below, an example of such a group of resources is a number of physical resource blocks each consisting of a predetermined number of subcarriers and a predetermined number of orthogonal frequency division multiple access (OFDMA) symbols. For example, a physical resource block may comprise 12 subcarriers and 7 or 14 OFDMA symbols (7 symbols for a slot or 14 symbols for a subframe) in the case of a regular cyclic prefix length (and 6 or 12 OFDMA symbols respectively in the case of an extended cyclic prefix length). Therefore, the group may correspond to basic scheduling that is independent of any subcarrier spacing applied. For specific scenarios, such as, for example, URLLC, a mini-slot consisting of a few OFDMA symbols (such as 1 or 2) may be defined.

Further, in the described applications, the forward compatible resource may be selected such that it is specific for a particular signal and/or channel. In other words, a resource may be selected independently for one signal (and/or channel) relative to the selection of a resource for another signal (and/or channel). This enables the signaling overhead for indicating a particular forward compatible resource to be minimised.

Figure 5:
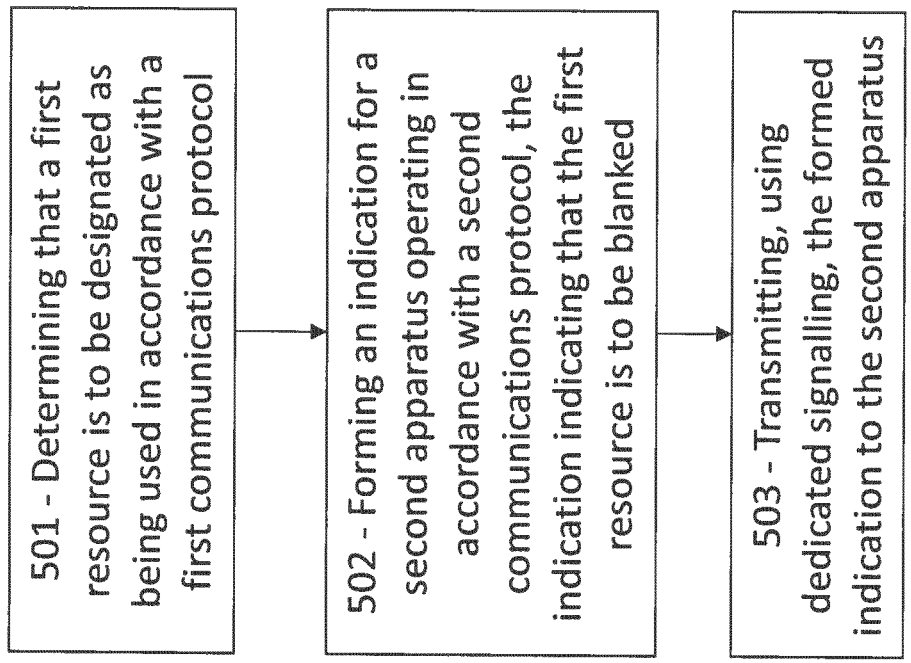
FIG. 5 shows a flow chart depicting potential actions executed by a network apparatus.

Potential actions of the network apparatus are described in relation to FIG. 5. These actions may describe an algorithm that may be effected when computer code stored in at least one memory of the network apparatus is executed on at least one processor of the network apparatus.

At 501, a network apparatus is configured to determine that a first resource is to be designated as being used in accordance with a first communications protocol.

In one aspect, the determination may be made in dependence on a consideration of which resources are allocated to an apparatus operating in accordance with the first communications protocol. The first resource may be allocated by the network apparatus. The first resource may be allocated by another network apparatus. In this latter case, the another network apparatus may be configured to signal an indication of this allocated first resource to the network apparatus. In other words, the network apparatus may be configured to receive an indication of which resources are allocated to the apparatus operating in accordance with the first communication protocol.

The network apparatus may be configured to identify an apparatus operating in accordance with the first protocol. The first resource may be assigned to the apparatus operating in accordance with the first protocol. The network apparatus may be the apparatus operating in accordance with the first protocol. A user apparatus (not the second apparatus) may be the apparatus operating in accordance with the first protocol.

In another aspect, the determination may be made in dependence on a consideration of which resources are allocated/assigned to the network apparatus for use in communications made in accordance with the first communications protocol.

As part of the determining, the network apparatus may be configured to determine that the first resource is one of a first plurality of resources to be used in accordance with the first communications protocol, the first plurality of resources forming a first predefined configuration of resources. In this case, the indication is formed so as to include an explicit indication of the first predefined configuration. The plurality of resources may be determined, for example, with reference to one or more physical resource blocks, an entire physical resource block (PRB), a (non-integer) fraction of a PRB, or a combination of one more PRBs and fraction(s) of PRB. The plurality of resources may be defined with reference to certain predefined numerology/conditions, for example, numerology defined for 15 kHz subcarrier spacing, or numerology defined for 60 kHz, respectively.

For example, some operations that may be performed by a communication protocol include the transmission of a channel state information reference signal (CSI-RS). The CSI-RS may be transmitted periodically or aperiodically. CSI-RS may be transmitted aperiodically in response to a trigger signal. The trigger signal may be initiated dynamically by the network apparatus. The network apparatus may be configured to use a first configuration of resources to be blanked for a periodic CSI-RS whilst using a second, different, configuration of resources to be blanked for an aperiodic CSI-RS. The network apparatus may comprise a first set of resource configurations that are all designated for use with periodic CSI-RS operations. The network apparatus may be configured to select one of the resource configurations from the first set for use with a particular periodic CSI-RS that will be applied by the network apparatus. The network apparatus may comprise a second set of resource configurations that are all designated for use with aperiodic CSI-RS operations. The network apparatus may be configured to select one of the resource configurations from the second set for use with a particular aperiodic CSI-RS that will be applied by the network apparatus. Another example of when a predefined resource configuration (or configurations) may be used is when assigning resources for when a user apparatus performs blind detection on a physical downlink control channel (PDCCH). Yet other examples of when a predefined resource configuration or configurations may be used is for when a user apparatus is receiving physical downlink shared channel (PDSCH), when a user apparatus is transmitting physical uplink shared channel (PDSCH), and when a user apparatus is transmitting physical uplink control channel (PUCCH).

The network apparatus may be configured to configure forward compatible resources via a higher layer signaling (such as radio resource control). For example, when a base station configures a CSI-RS for a user apparatus, the configuration may contain information elements indicating also which resource elements are designated as being for the first (later version) communication protocol. This process is illustrated further below with respect to FIGS. 8 and 9. An example of lower layer signaling is discussed below with reference to providing the indication in a downlink control information (DCI) element transmission.

Another option, which may be used in addition and/or in the alternate, is to configure forward compatible resources explicitly for a user apparatus via a selected configuration. This configuration is used to mask all transmission/reception carried out by a user apparatus that overlap the forward compatible resource. The forward compatible resource configuration can be defined by, for example, a periodical pattern. The periodical pattern may be defined with a predefined periodicity and a time offset with respect to a known time reference (such as, for example, the system frame number). Other forms of providing a time reference are possible (such as, for example, a time stamp indicating subframes or slots or mini-slots having predefined forward compatible configuration(s)).

In an example, the network apparatus may be programmed to configure multiple forward compatible resource configurations for a particular group of user apparatuses and/or a particular user apparatus and/or a particular channel and/or a particular signal. In other words, there may be a plurality of predefined forward compatible resource configurations and the network apparatus may be configured to select a configuration from this plurality of configurations for a particular use case. The actual forward compatible resources configuration selected by the network apparatus can be made using, for example, downlink control information triggering the corresponding transmission (such as physical downlink control channel and the physical uplink shared channel). For example, one or more bits/signaling states in the signaled downlink control information may be used to indicate the configuration of resources that are designated as being for the first (later version) communication protocol. Another example would be to define different cell radio network temporary identifiers (C-RNTI) for the cases with and without forward compatible resources. A C-RNTI is used to identify a connection of a group of user apparatuses and/or a user apparatus to a network apparatus within a particular cell. Therefore, use of a particular C-RNTI may indicate that a particular configuration of forward compatible resources have been designated by the network apparatus.

At 502, the network apparatus is configured to form an indication for indicating that the first resource is to be blanked, or otherwise be treated as being blanked, by a second apparatus operating in accordance with a second communications protocol. By this, it is meant that the formed indication is usable to indicate that the first resource is not assigned to the second apparatus. Therefore, the indication may be used to indicate to the second apparatus that the first resource should be omitted from consideration for operations performed by the second apparatus. For example, the second apparatus may be configured to perform a series of measurements across at least part of a communications channel as part of the second communication protocol. However, no measurements will be performed across blanked resources. Measurement reporting may also be omitted from the blanked resources. As another example, the second apparatus may be configured to omit the first resource when performing rate matching and data mapping into resource elements. In other words, the first resource is excluded from a set of available resource space defined with reference to a transmitter and receiver.

At 503, the network apparatus is configured to transmit, using dedicated signaling, the indication to the second apparatus.

The dedicated signaling may be a unicast signaling in which only the second apparatus is configured to receive and decode the transmitted indication. Another option is to convey the signaling for a group of user apparatuses, the second apparatus forming a member of the group and the group comprising more than one apparatuses. In both cases, the explicit signaling can be made using higher layer signaling such as RRC (Radio Resource Configuration) signaling. The signaling may be done separately for uplink resource and downlink resources. Another option is to have a joint signaling, that covers forward compatible resource configuration for uplink and downlink at the same time. In other words, joint signaling may define forward compatible resource configurations for both uplink and downlink in the same signaling procedure.

Forward compatible resources can be facilitated also by means of implicit signaling.

The following discusses an example of implicit signaling. Following this approach, the network apparatus does not schedule any data/control on resource elements considered as a resource for forward compatible. Therefore, the second apparatus is configured to assume that any resource not assigned to the second apparatus is designated as a resource for apparatuses operating in accordance with the first protocol. In other words, the second apparatus is configured to blank any resource that is not explicitly assigned to the second apparatus. Implicit signaling may be considered to have some limitations compared to explicit signaling. For example, implicit signaling does not allow muting of periodical sounding signals (such as CSI-RS and/or a sounding reference signal (SRS)). Furthermore, implicit signaling may increase a user apparatus' processing burden. Further, the implicit signaling detailed above may not have sufficient allocation granularity for indicating forward compatible resources in the scenarios depicted in FIG. 4 (at least with a reasonable resource allocation size). This may increase the overhead compared to the use of explicit indications. Implicit scheduling also has its limitations in resource allocations relating to wideband operations lasting a relatively short time and narrowband operations lasting a relatively longer time.

An explicit indication may be at least one bit in the transmitted signal that identifies at least the first resource.

In one of the aspects mentioned above, reference was made to the first resource forming part of a first plurality of resources i.e. forming part of a first predefined configuration of resources. Further to this aspect, the network apparatus may be configured to determine that a second resource is designated as to be used in accordance with the first communications protocol, said second resource being one of a second plurality of resources to be used in accordance with the first communications protocol, the second plurality of resources forming a second predefined configuration of resources. The network apparatus may be configured to transmit an indication of the second predefined configuration to the second apparatus.

The indication of the second predefined configuration may be included in the transmission to the second apparatus that also indicates the first predefined configuration. In this case, the second apparatus (e.g. the user apparatus) is configured to blank those resources associated with the first and second predefined configuration conterminously.

The indication of the second predefined configuration may be included in a separate transmission from the network apparatus to the second apparatus to the transmission that indicates the first predefined configuration. In this case, the second apparatus may be configured to blank those resources associated with the first and second predefined configuration conterminously or to blank those resources in an exclusive OR operation (e.g. so that either the resources of the first predefined configuration are blanked or the resources of the second predefined configuration are blanked, but not both conterminously). Combinations of these two approaches may also be employed. For example, some of the resources associated with the first and second predefined configurations may be blanked conterminously by the second apparatus whilst others of the resources are not blanked conterminously. Furthermore, at least one of the bits/signaling states may indicate neither the first nor the second predefined configuration is used in the current sub-frame/slot/mini-slot. This means that in the current resource allocation indicated by a particular downlink control information element, forward compatible resource configuration is omitted and all resource elements indicated by the downlink control information element are applied.

The network apparatus may be further configured to determine that a third resource is to be used in accordance with the first communications protocol. This determination may be performed in an analogous manner to the mechanism described above with respect to the first resource.

The network apparatus may be configured to form an indication for indicating that the third resource is to be blanked.

The network apparatus may be configured to transmit, using non-dedicated signaling, the indication to the second apparatus operating in accordance with the second communications protocol. Thus, the indication of the third resource may be included in a separate transmission from the network apparatus to the second apparatus to the transmission that indicates the first resource. A non-dedicated signal may be a signal that may be received by an indiscriminate number of user apparatuses. A non-dedicated signal is not configured to be received by only a specific subset of users. Examples of non-dedicated signaling include multicast transmissions (depending on the multicast group) and broadcasts transmissions.

One example of a broadcast transmission as a non-dedicated signal is a system information transmission broadcasted as part of a network apparatus' requirements to enable a user apparatus to connect to the network apparatus. Thus, a network apparatus may be configured to broadcast an indication of forward compatible resources as part of an access procedure. This signaling may also reach user apparatuses operating in an IDLE mode, which do not have a radio resource control connection to the cell. The system information transmission may comprise one or more of the following parameters: CSI-RS (and/or beam reference signal) bandwidth; sounding reference signal bandwidth; a downlink control channel bandwidth; and an uplink control channel bandwidth. Broadcasting forward compatible resource information with a high granularity in frequency and/or time may result in a relatively high signaling overhead, and result in a relatively static configuration of resources designated as being for forward compatible.

An example of a multicasting transmission is the use of a common downlink control information (DCI) element transmitted on the physical downlink control channel. A Common DCI comprises resource assignments for a user apparatus or a group of user apparatuses. A network apparatus may be configured to transmit a plurality of DCIs in a subframe/slot. The common DCI indicates the subframe type for current and future subframes/radio frame(s). In these scenarios, indicated resources can be treated by the second apparatus as being for apparatuses operating in accordance with the first communication protocol. There are some associated limitations with this approach. For example, in addition to having a relatively high signaling overhead, there is an increased burden on the second apparatus when performing blind detection on this signal and this approach is also sensitive to signaling errors (for example, in the case when the user apparatus does not detect common DCI).

As mentioned above, the network apparatus may be configured to use the above-mentioned non-dedicated signaling for signaling an indication of at least the third resource to the second apparatus whilst using the above-mentioned dedicated signaling for signaling an indication of the first resource to the second apparatus. The combination of these two signaling methods may be combined to advantageous effects.

Thus, in the present aspect, a user apparatus may follow (blank) a resource configuration defined by the received system information in a broadcast and/or multicast transmission by a network apparatus. Subsequently, the user apparatus may follow (blank) a resource configured specifically signaled to the user apparatus by the network apparatus.

As an example, the non-dedicated signal may be utilised during cell search, and/or synchronisation acquisition and/or initial access procedures. This is because these procedures use broadcast and multicast signals already, and so may be gainfully adapted to also comprise the above-mentioned indications of resources that are designated as being for the first communications protocol. Once an apparatus is connected to the network apparatus, dedicated signaling of the resources designated by the network apparatus as being for use in the first protocol may be performed. The dedicated signaling may utilise a radio resource control signaling procedure, or some other layer 3 (or higher) mechanism for effecting dedicated signaling.

In these procedures, a base station transmits at least synchronization signals and the physical broadcast channel in an operating mode having an agnostic manner. In this context, the operating mode means either single-beam (base station transmits the signals using sector beam(s)) or multi-beam (base station transmits the signals using beam sweeping).

As an example, we note that the broadcast/multicast signals mentioned above may be transmitted on relatively narrow bandwidth and on resources for which no forward compatible resource configuration may take place/be assigned. In addition to these signals, the base station may transmit beam reference signals (BRS) that can occupy wider bandwidth. To reduce a potential initial search hypothesis and minimize broadcast channel payload size, the system may use a forward compatible resource configured BRS with lower granularity than for the signals transmitted and received while user apparatus is in connected state. There may be only some limited number of forward compatible resources options for a beam forming reference signal (BRS) meaning that forward compatible resources applied for BRS may have more resource elements than the actual forward compatible resources would require. A user apparatus would read forward compatible resources configuration for a beam forming reference signal from, for example, a physical broadcast.

Figure 6:
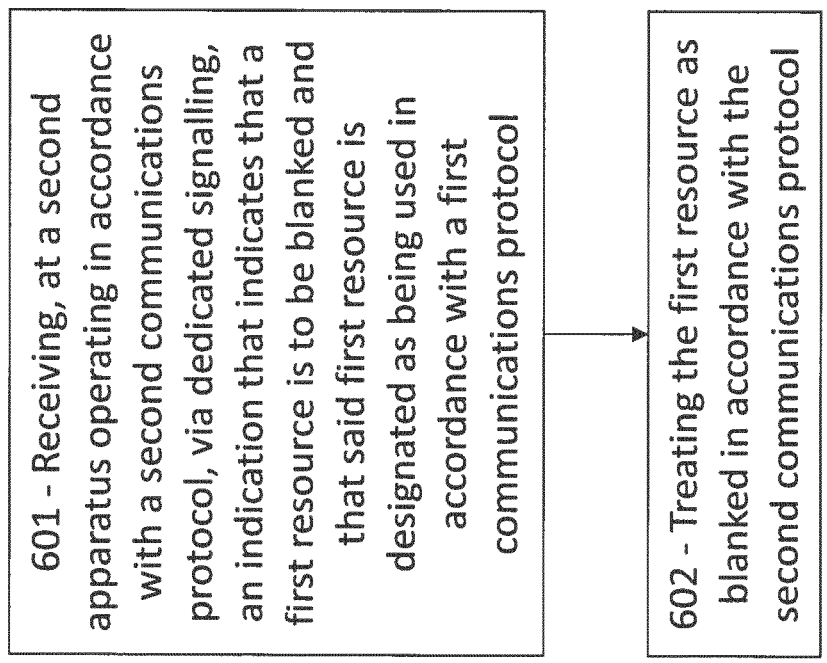
FIG. 6 shows a flow chart depicting potential actions executed by a user apparatus.

Potential actions of the user apparatus/apparatus being configured by the network apparatus are described in relation to FIG. 6. These actions may describe an algorithm that may be effected when computer code stored in at least one memory of the network apparatus is executed on at least one processor of the network apparatus.

At 601, the user apparatus, which is configured to operate in accordance with a second communications protocol, is configured to receive an indication that indicates that a first resource is to be blanked and that said first resource is to be used in accordance with a first communications protocol.

At 602, the user apparatus is configured to treat the first resource as being blanked in accordance with the second communications protocol. By this, it is meant that the user apparatus is configured to not consider the first resource during at least one subsequent operation (for example, rate matching and/or making resource measurements).

The indication may comprise an explicit indication of a first predefined configuration, wherein the first resource is one of a first plurality of resources to be used in accordance with the first communications protocol, the first plurality of resources forming the first predefined configuration of resources.

The user apparatus may further be configured to receive an indication of a second predefined configuration, wherein the second predefined configuration indicates a second resource that is to be used in accordance with the first communications protocol, said second resource being one of a second plurality of resources to be used in accordance with the first communications protocol, the second plurality of resources forming the second predefined configuration of resources.

The user apparatus may be further configured to receive, via non-dedicated signaling, an indication indicating that a third resource is to be blanked because the third resource is to be used in accordance with the first communications protocol. Comments made above with respect to non-dedicated signaling also apply in respect of the user apparatus.

Further specific examples of the above are now discussed.

Figure 7C:
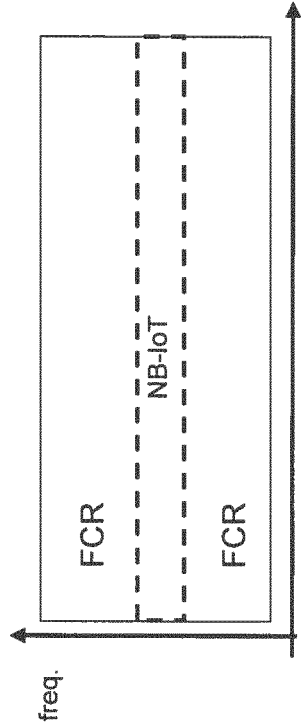
FIG. 7 shows an example of resource assignment.
Figure 7A:
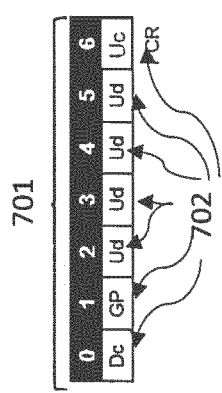
Figure 7B:
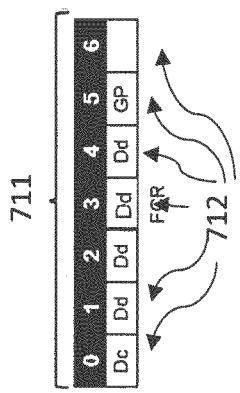

As one example, we refer to FIGS. 7A to 7C. These Figures are used to provide illustrative examples of situations in which a forward compatible resource configuration is defined separately for different slot/subframe types, as well as for different parts of a slot/subframe. This is useful because the above-described techniques should be able to reserve a defined time and/or frequency resource as a forward compatible resource regardless of what slot or subframe type, or sub-carrier spacing a user apparatus is scheduled with. It is understood that these are merely example configurations (for uplink and/or downlink), and that other configurations are possible. In particular, the various configurations may be defined with reference to the particular system (and, more specifically, to the particular version of a communication protocol) to which the presently described techniques are being applied.

FIG. 7A depicts an example subframe (a.k.a. slot) 701 comprising seven OFDMA symbols 702. The first of these OFDMA symbols comprises downlink control channel information. Four of the OFDMA symbols comprise uplink data. The last of these OFDMA symbols is allocated for uplink control information. A narrowband IoT user apparatus may consider that this uplink control OFDMA symbol is always reserved as a forward compatible resource. In such an embodiment in which the uplink control OFDMA symbol is always reserved as a forward compatible resource, the control information for the uplink may be multiplexed with the uplink data in at least one of the uplink OFDMA symbols.

FIG. 7B depicts an example subframe 711 comprising seven OFDMA symbols 712. The first of these OFDMA symbols comprises downlink control channel information (such as DCI). Four of the symbols comprise downlink data. The last of these OFDMA symbols is allocated for uplink control information. This subframe type is an example of a downlink subframe. In the example shown in FIG. 7B, the third data symbol of this downlink subframe is considered as being a forward compatible resource.

A forward compatible resources configuration may be defined also based on a class and/or category of user apparatus. For example, the forward compatible resource configuration may be selected based on the bandwidth capability of the user apparatus. This is illustrated with respect to FIG. 7C. In FIG. 7C, there is depicted a graph having time on the x-axis and frequency on the y-axis. In this example, a user apparatus operating using a narrowband-IoT transmission protocol considers certain frequency resources operating outside of its narrowband as forward compatible resources.

Figure 8:
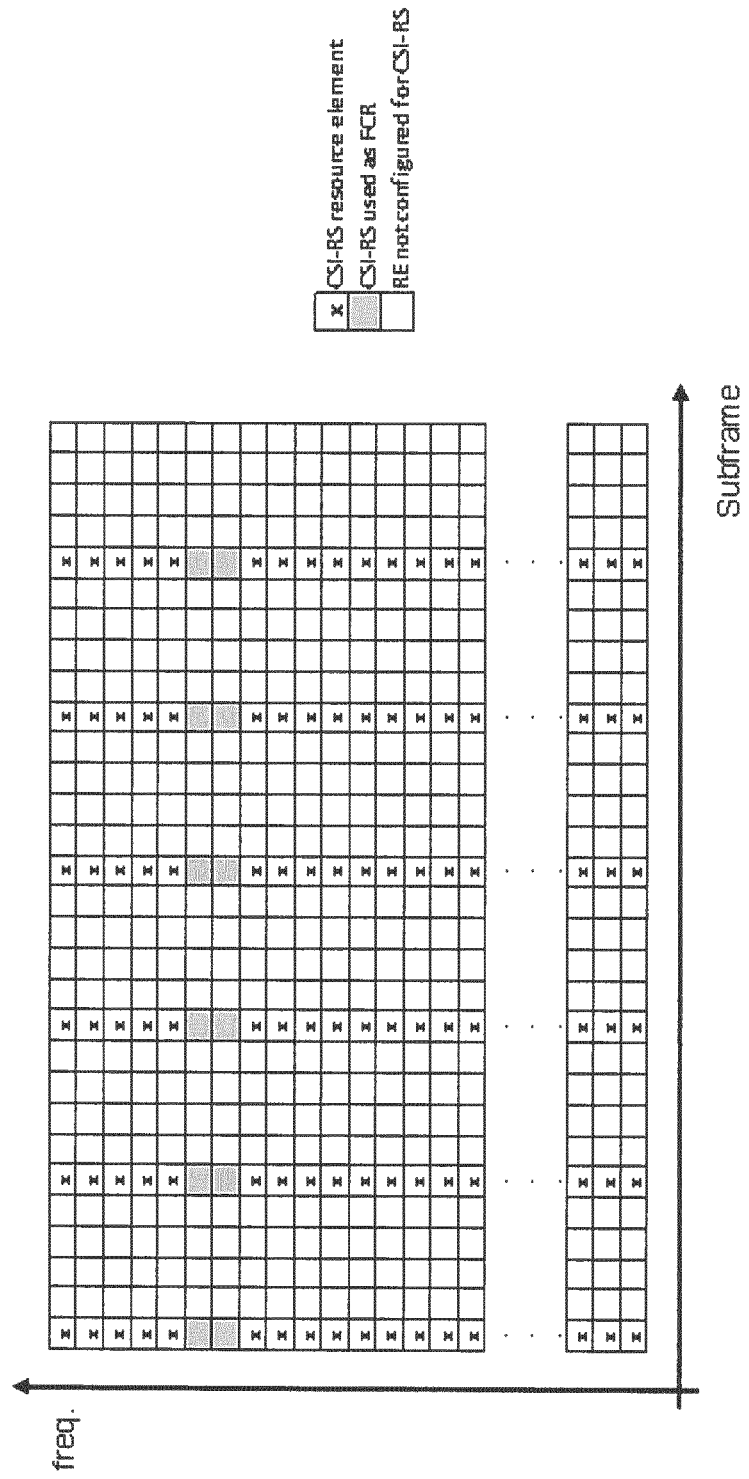
FIG. 8 shows an example of resource assignment in a periodic system.

FIG. 8 shows an example of forward compatible resources configuration for periodic CSI-RS. Although not explicitly detailed, it is understood that analogous comments apply in respect of a periodic sounding reference signal.

FIG. 8 shows a graph having subframe labelled on the x axis and frequency labelled on the y axis. A grid is present in the graph. In the grid, some grid elements are shaded to indicate that that subframe/frequency combination (resource element (RE)) is used as a CSI-RS resource element. By this, it is meant that it is designated for use for CSI-RS transmissions. Other grid elements are differently shaded to indicate to indicate that that resource element is configured as a CSI-RS that is used as a forward compatible resource. Other grid elements are shaded to indicate that that resource element is not configured for CSI-RS.

For periodic CSI-RS, the CSI-RS is transmitted via predetermined REs of the subframe/slot. Also, in the depicted example, the periodic CSI-RS has a periodicity of ⅕ subframes in the current example (it is understood that this periodicity may vary in accordance with different specific embodiments). Therefore, for such an arrangement, the same frequency of resource may be used for a forward compatible resource, regardless of the subframe number. This is shown in FIG. 8, in which the same two frequencies are designated as being for forward compatible elements regardless of the subframe number.

In the considered example, predefined CSI-RS resource elements are used as forward compatible resources. The corresponding CSI-RS are thus blanked by the received user apparatus. As one example of blanking, the user apparatus may take into account forward compatible resources in the CSI measurement/reporting in such that the user apparatus does not measure and/or report CSI from forward compatible resources region.

Figure 9:
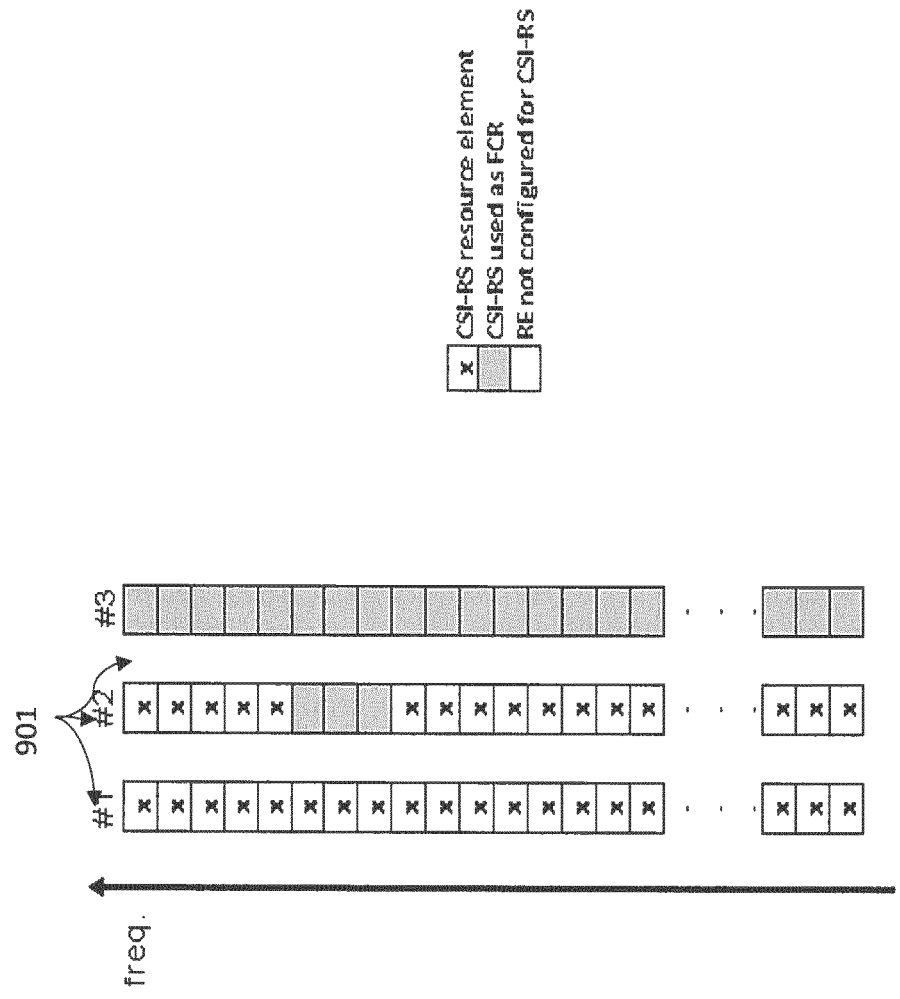
FIG. 9 shows an example of resource assignment in an aperiodic system.

FIG. 9 shows an example of forward compatible resources configuration for aperiodic CSI-RS. Aperiodic CSI-RS is shown in FIG. 9 as being transmitted via predetermined resource elements of a particular subframe/slot. Aperiodic CSI-RS may be triggered by receipt of Downlink Control information (e.g. DCI used to schedule physical downlink shared channel transmissions)

FIG. 9 depicts three grids 901, each having a unit width and extending along the y-axis. Frequency is marked along a y-axis. Each of the grids represents a potential predefined configuration option. In each grid, some grid elements are shaded to indicate that that subframe/frequency combination (resource element RE) is used as a CSI-RS resource element. By this, it is meant that it is designated for use for CSI-RS transmissions. Other grid elements are differently shaded to indicate that that resource element is configured as a CSI-RS that is used as a forward compatible resource.

As shown in FIG. 9, there are a plurality of grids 901 that represent potential configuration options for which resource elements are designated for use as forward compatible resources and which resource elements aren't. A network apparatus is configured to select a particular configuration option in dependence on the forward compatible scenario being employed. Option #1 (labelled in FIG. 9) indicates that, in the current resource allocation indicated by the downlink control information element, the forward compatible resource configuration is omitted and consequently all resource elements configured for CSI-RS are transmitted by the network apparatus (and received by the user apparatus).

More generally, a configuration of forward compatible resources may implicitly or explicitly set guard bands on the edge of forward compatible resources in the frequency domain. In implicit configuration, a pre-defined guard band is applied. In contrast, in explicit configuration, there may be a further indication as to whether or not a guard band is to be applied. Alternatively, the forward compatible resource configuration may include in-built guard bands on the edges.

In general, reference signal structures may be constructed using orthogonal cover codes to increase a reference signal capacity in code domain. Forward compatible resources configuration may implicitly cut the reference signal sequence so that no partial orthogonal cover code is applied before and after the blanked forward compatible resources in frequency and/or time.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone LTE networks, similar principles maybe applied in relation to other examples of standalone 3G, LTE or 5G networks. It should be noted that other embodiments may be based on other cellular technology other than LTE or on variants of LTE. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   determining, with a first apparatus, that a first time-frequency resource is to be designated as being used in accordance with a first communications protocol, wherein the first time-frequency resource comprises a time-frequency resource for transmission of one of: a periodic channel state information reference signal, or an aperiodic channel state information reference signal;
   forming an indication for a second apparatus operating in accordance with a second communications protocol, the indication indicating that the first time-frequency resource is to be blanked, wherein the second communications protocol is a different, earlier version of the first communications protocol, wherein the indication comprises an indication that the first time-frequency resource is to be blanked because the first time-frequency resource is assigned to at least one apparatus operating in accordance with the first communications protocol, wherein the indication comprises an explicit indication that indicates whether or not a forward compatible resource configuration is to be applied with the second apparatus;
   transmitting, using dedicated signalling while the first apparatus is connected to a network, the formed indication to the second apparatus, wherein the dedicated signalling comprises one of:
      radio resource control signaling, or
      signaling via at least one layer one downlink control information element;
   receiving a channel state information measurement report from the second apparatus, the channel state information measurement report excluding channel state information from the first time-frequency resource;
   determining that a second time-frequency resource is to be used in accordance with the first communications protocol;
   forming a further indication for indicating that the second time-frequency resource is to be blanked; and
   transmitting, using non-dedicated signalling, the further indication to the second apparatus, wherein the further indication is transmitted during at least one of: cell search, synchronization acquisition, or initial access.

2. A method comprising:
   receiving from a first apparatus, at a second apparatus operating in accordance with a second communications protocol, via dedicated signalling, an indication that indicates that a first time-frequency resource is to be blanked and that said first time-frequency resource is designated as being used in accordance with a first communications protocol, wherein the first time-frequency resource comprises a time-frequency resource of a first configuration for transmission of one of: a periodic channel state information reference signal, or an aperiodic channel state information reference signal, wherein the second communications protocol is a different, earlier version of the first communications protocol, wherein the indication comprises an indication that the first time-frequency resource is to be blanked because the first time-frequency resource is assigned to at least one apparatus operating in accordance with the first communications protocol, wherein the indication comprises an explicit indication that indicates whether or not a forward compatible resource configuration is to be applied with the second apparatus, wherein the dedicated signalling comprises one of:
radio resource control signaling, or
signaling via at least one layer one downlink control information element;
treating the first time-frequency resource as blanked in accordance with the second communications protocol by avoiding, when performing measurement of the periodic or aperiodic channel state information reference signal, the first time-frequency resource and excluding the first time-frequency resource from a channel state information measurement report reporting the performed measurement; and
receiving, via non-dedicated signalling, a further indication indicating that a second time-frequency resource is to be blanked because the second time-frequency resource is to be used in accordance with the first communications protocol.

3. An apparatus comprising;
at least one processor; and
at least one non-transitory memory comprising code that, when executed with the at least one processor, causes the at least one processor to:
determine that a first time-frequency resource is to be designated as being used in accordance with a first communications protocol, wherein the first time-frequency resource comprises a time-frequency resource for transmission of one of: a periodic channel state information reference signal, or an aperiodic channel state information reference signal;
form an indication for a second apparatus operating in accordance with a second communications protocol, the indication indicating that the first time-frequency resource is to be blanked, wherein the second communications protocol is a different, earlier version of the first communications protocol, wherein the indication comprises an indication that the first time-frequency resource is to be blanked because the first time-frequency resource is assigned to at least one apparatus operating in accordance with the first communications protocol, wherein the indication comprises an explicit indication that indicates whether or not a forward compatible resource configuration is to be applied with the second apparatus;
transmit, using dedicated signaling while the apparatus is connected to a network, the formed indication to the second apparatus, wherein the dedicated signaling comprises one of:
radio resource control signaling, or
signaling via at least one layer one downlink control information element;
receive a channel state information measurement report from the second apparatus, the channel state information measurement report excluding channel state information from the first time-frequency resource;
determine that a second time-frequency resource is to be used in accordance with the first communications protocol;
form a further indication for indicating that the second time-frequency resource is to be blanked; and transmit, using non-dedicated signalling, the further indication to the second apparatus, wherein the further indication is transmitted during at least one of: cell search, synchronization acquisition, or initial access.

4. The apparatus as claimed in claim 3, wherein the at least one processor is further caused to:
determine that the first time-frequency resource is one of a first plurality of resources to be used in accordance with the first communications protocol, the first plurality of resources forming a first predefined configuration of time-frequency resources; and
include in the indication an explicit indication of the first predefined configuration.

5. The apparatus as claimed in claim 4, wherein the at least one processor is further caused to:
determine that a third time-frequency resource is to be used in accordance with the first communications protocol, said third time-frequency resource being one of a second plurality of time-frequency resources to be used in accordance with the first communications protocol, the second plurality of time-frequency resources forming a second predefined configuration of time-frequency resources; and
transmit an indication of the second predefined configuration to the second apparatus.

6. The apparatus as claimed in claim 5, wherein the first and second predefined configurations of time-frequency resources are determined for one of:
the second apparatus alone;
a plurality of apparatuses, the plurality comprising the second apparatus;
a specific channel; or
a specific signal to be transmitted.

7. The apparatus as claimed in claim 3, wherein the first communications protocol comprises a protocol of a different communications standard than the second communications protocol,
wherein the second communications protocol comprises one of:
a long term evolution protocol,
a Wi-Fi protocol,
a third generation protocol, or
a global system for mobile communications protocol,
wherein the first communications protocol comprises one of:
a new radio protocol, or
a fifth generation protocol.

8. The apparatus as claimed in claim 3, wherein said dedicated signalling is dedicated for at least one of
a specific apparatus,
a group of apparatuses,
a specific channel, and/or
a specific signal.

9. The apparatus as claimed in claim 3, wherein the first time-frequency resource is designated as being used in accordance with the first communications protocol where, according to the first communications protocol, the first time-frequency resource is used to provide a guard band between time-frequency resources used for transmission on the first and second communications protocols at any one time.

10. The apparatus as claimed in claim 3, wherein a combination of the indication that the first time-frequency resource is to be blanked and the further indication that the second time-frequency resource is to be blanked is configured to cause the second apparatus to blank one of the first time-frequency resource or the second time-frequency resource.

11. An apparatus comprising:
    at least one processor; and
    at least one non-transitory memory comprising code that, when executed with the at least one processor, causes the at least one processor to:
        receive, from a first apparatus via dedicated signaling, an indication that indicates that a first time-frequency resource is to be blanked and that said first time-frequency resource is designated as being used in accordance with a first communications protocol, wherein at the apparatus is a second apparatus operating in accordance with a second communications protocol, wherein the first time-frequency resource comprises a time-frequency resource for transmission of one of: a periodic channel state information reference signal, or an aperiodic channel state information reference signal, wherein the second communications protocol is a different, earlier version of the first communications protocol, wherein the indication comprises an indication that the first time-frequency resource is to be blanked because the first time-frequency resource is assigned to at least one apparatus operating in accordance with the first communications protocol, wherein the indication comprises an explicit indication that indicates whether or not a forward compatible resource configuration is to be applied with the second apparatus, wherein the dedicated signalling comprises one of:
            radio resource control signaling, or
            signaling via at least one layer one downlink control information element;
        treat the first time-frequency resource as blanked in accordance with the second communications protocol by avoiding, when performing measurement of the periodic or aperiodic channel state information reference signal, the first time-frequency resource and excluding the first time-frequency resource from a channel state information measurement report reporting the performed measurement; and
        receive, via non-dedicated signalling, a further indication indicating that a second time-frequency resource is to be blanked because the second time-frequency resource is to be used in accordance with the first communications protocol.

12. The apparatus as claimed in claim 11, wherein the indication comprises an explicit indication of a first predefined configuration, wherein the first time-frequency resource is one of a first plurality of resources to be used in accordance with the first communications protocol, the first plurality of resources forming the first predefined configuration of time-frequency resources.

13. The apparatus as claimed in claim 12 wherein the at least one processor is further caused to:
    receive an indication of a second predefined configuration, wherein the second predefined configuration indicates a third time-frequency resource that is to be used in accordance with the first communications protocol, said third time-frequency resource being one of a second plurality of time-frequency resources to be used in accordance with the first communications protocol, the second plurality of time-frequency resources forming the second predefined configuration of time-frequency resources.

14. The apparatus as claimed in claim 13, wherein the at least one processor is further caused to receive at least one indication that indicates that the first and second predefined configurations of time-frequency resources are for one of: the second apparatus alone; a plurality of apparatuses, the plurality comprising the second apparatus; a specific channel; or a specific signal to be transmitted.

15. The apparatus as claimed in claim 11, wherein treating the first time-frequency resource as blanked further comprises the at least one processor is further caused to:
    rate matching and mapping data around the first time-frequency resource so as to exclude the first time-frequency resource from the rate matching and mapping.

16. A non-transitory computer readable medium encoded with a computer program comprising computer executable instructions, which when executed with a computer, cause the computer to:
    determine that a first time-frequency resource is to be designated as being used in accordance with a first communications protocol, wherein the first time-frequency resource comprises a time-frequency resource for transmission of one of: a periodic channel state information reference signal, or an aperiodic channel state information reference signal;
    form an indication for a second apparatus operating in accordance with a second communications protocol, the indication indicating that the first time-frequency resource is to be blanked, wherein the second communications protocol is a different, earlier version of the first communications protocol, wherein the indication comprises an indication that the first time-frequency resource is to be blanked because the first time-frequency resource is assigned to at least one apparatus operating in accordance with the first communications protocol, wherein the indication comprises an explicit indication that indicates whether or not a forward compatible resource configuration is to be applied with the second apparatus;
    cause transmitting, using dedicated signaling during connection to a network, of the formed indication to the second apparatus, wherein the dedicated signaling comprises one of:
        radio resource control signaling, or
        signaling via at least one layer one downlink control information element;
    cause receiving of a channel state information measurement report from the second apparatus, the channel state information measurement report excluding channel state information from the first time-frequency resource;
    determine that a second time-frequency resource is to be used in accordance with the first communications protocol;
    form a further indication for indicating that the second time-frequency resource is to be blanked; and
    cause transmitting, using non-dedicated signalling, of the further indication to the second apparatus, wherein further indication is transmitted during at least one of: cell search, synchronization acquisition, or initial access.

17. A non-transitory computer readable medium encoded with a computer program comprising computer executable instructions, which when executed with a computer, cause the computer to:
    cause receiving, at a second apparatus operating in accordance with a second communications protocol, via dedicated signaling, an indication that indicates that a first time-frequency resource is to be blanked and that said first time-frequency resource is designated as being used in accordance with a first communications protocol, wherein the first time-frequency resource comprises a time-frequency resource for transmission of one of: a periodic channel state information reference signal, or an aperiodic channel state information reference signal, wherein the second communications protocol is a different, earlier version of the first communications protocol, wherein the indication comprises an indication that the first time-frequency resource is to be blanked because the first time-frequency resource is assigned to at least one apparatus operating in accordance with the first communications protocol, wherein the indication comprises an explicit indication that indicates whether or not a forward compatible resource configuration is to be applied with the second apparatus, wherein the dedicated signaling comprises one of:

radio resource control signaling, or signaling via at least one layer one downlink control information element;

treat the first time-frequency resource as blanked in accordance with the second communications protocol by avoiding, when performing measurement of the periodic or aperiodic channel state information reference signal, the first time-frequency resource and excluding the first time-frequency resource from a channel state information measurement report reporting the performed measurement; and cause receiving, via non-dedicated signalling, of a further indication indicating that a second time-frequency resource is to be blanked because the second time-frequency resource is to be used in accordance with the first communications protocol.

* * * * *